Jan. 27, 1959     H. J. RICHARD     2,870,523
CUTTING TOOLS

Filed Aug. 10, 1956

Inventor
Henry J. Richard
by Roberts, Cushman & Grover
Attys

United States Patent Office 2,870,523
Patented Jan. 27, 1959

2,870,523

CUTTING TOOLS

Henry J. Richard, Lincoln, Mass., assignor of fifty-one percent to Theophile J. La Lime, Redding, Conn.

Application August 10, 1956, Serial No. 603,254

2 Claims. (Cl. 29—96)

This invention relates to cutting tools of the type comprising bits adapted to be mounted in holders with one side of each bit seating on a shim or anvil and the other side engaged by a keeper, usually in the form of a chip breaker, to keep the bit in fixed position in the tool holder. It has been proposed to provide such bits with lateral sides meeting at corners to provide a plurality of cutting edges so that when one point becomes dull the bit may be shifted in the holder to bring another edge into operative position. Heretofore it has been customary to make the top and bottom faces of the bit flat and to incline the lateral faces so that they make acute angles with the top face and obtuse angles with the bottom face, thereby to provide rake clearance for the cutting edges at the top face. Thus the bits can be used only top side up and not upside down.

Objects of the present invention are to provide bits of the character referred to which have a plurality of lateral sides making predetermined rake angles with the faces of the bits and which are reversible so that they have cutting edges with clearance on both sides of the bit, thereby significantly increasing the number of cutting edges on each bit.

According to the present invention the rake clearance is provided by cupping the faces of the bit to provide clearance at each of the cutting edges on both sides of the bit, whereby the bit may be used in a plurality of positions equal to the total number of points on both sides of the bit with rake clearance in each position. Any desired degree of rake clearance may be provided by choice of degree of cupping. The cutting edges may have any desired shape as for example pointed or round nose. Preferably the lateral sides of the bit are parallel to the central axis and the two faces are cupped to the same degree so that the rake clearances on the two sides are equal. While the lateral sides are preferably flat they may be concave or convex lengthwise or crosswise or both or they may be concave in either dimension and convex in the other dimension. The bit is held in position on its holder with a keeper which is shaped to fit into one of the two cupped faces. Preferably the shim or anvil engaging the other face is also shaped to fit the other face. While the cupped faces may have any desired contour they are preferably spherical.

Figure 1:
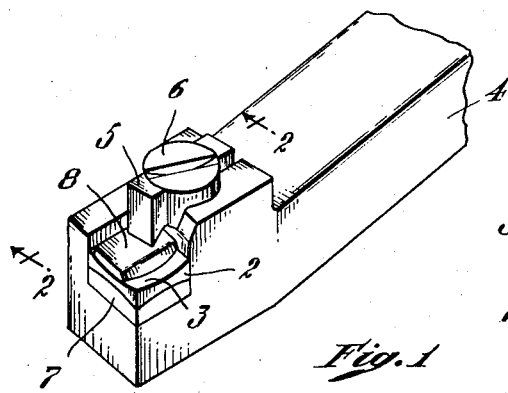
Figure 2:
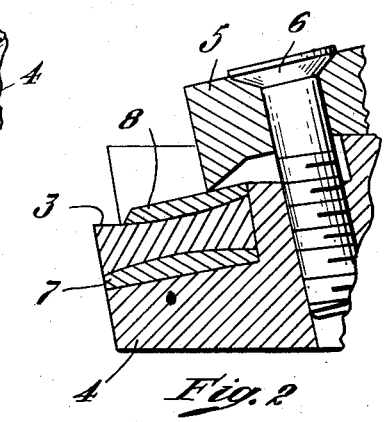
Figure 3:
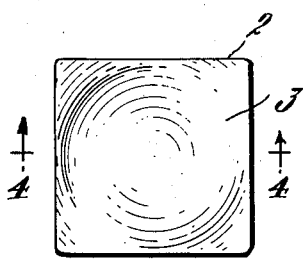
Figure 4:
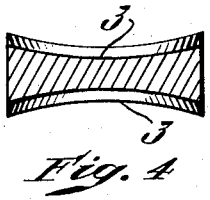
Figure 5:
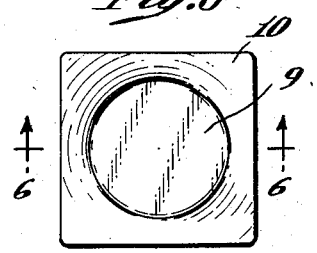
Figure 6:
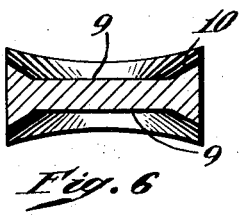
Figure 7:
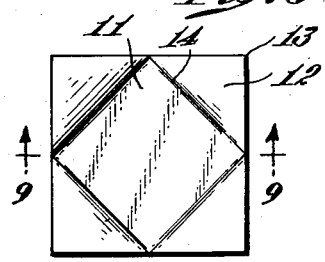
Figure 8:
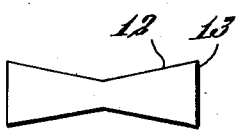
Figure 9:
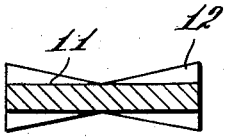

For the purpose of illustration typical embodiments of the invention are shown in the accompanying drawings in which Fig. 1 is an isometric view of the preferred embodiment of the invention mounted in a holder;
Fig. 2 is a section on line 2—2 of Fig. 1;
Fig. 3 is a plan view of the bit;
Fig. 4 is a section on line 4—4 of Fig. 3;
Fig. 5 is a plan view like Fig. 3 showing a modification;
Fig. 6 is a section on line 6—6 of Fig. 5;
Fig. 7 is a plan view of another modification;
Fig. 8 is an edge view of the modification shown in Fig. 7; and Fig. 9 is a section on line 9—9 of Fig. 7.

The particular embodiment of the invention shown in Figs. 1 to 4 comprises a square bit 1, having lateral sides lying in planes 2 which are parallel to the axis of the bit. The two faces 3 are cupped and inasmuch as they are identical the bit may be used with either surface uppermost. While the curvature of the illustrated embodiment is spherical it will be understood that it may have any desired contour such as paraboloidal, ellipsoidal, or including flat surfaces as hereinafter described.

While the bit may be employed in various kinds of holders, for the purpose of illustration it is shown mounted in a holder 4 by means of a clamp 5 and screw 6 with a shim 7 under the bit and a keeper in the form of a chip breaker 8 over the bit, the faces of the shim and keeper being curved to fit the faces of the bit.

In the modification shown in Figs. 5 and 6 the central portions 9 of the top and bottom faces are flat and the peripheral portions 10 are conical. With this bit the shim and keeper should have conical portions engaging the peripheral portions 10 with their central portions in contact with the flat portions 9 throughout a part or all of the flat portions or with clearance between the flat portions of the bit and those of the shim and keeper. While the surface 10 is shown as conical it may have any desired shape such as spherical, paraboloidal, ellipsoidal, etc.

In the modification shown in Figs. 7, 8 and 9 the central portions 11 are flat and parallel, while the corner portions 12 are flat and slope inwardly from the corners 13 to the lines 14 where they meet the central portion 11. Here again the shim and keeper should engage the corner portions 12 flatwise but may or may not contact the central portions 11.

When both faces of the bit are cupped in the same way, the shim and keeper fit both sides so that the same shim and keeper may be used to hold the bit with either side 3 uppermost. In this way the same degree of rake clearance is provided at each edge so that the rake clearance is the same when the bit is positioned in any one of the eight operative positions. However, if it is desired to provide different degrees of clearance on opposite sides for different classes of work, two sets of shims and keepers may be provided or the shim and keeper may be made identical so that either may be used as a shim and the other as a chip breaker. For most purposes it is preferable to shape both faces of the bit the same and to provide bits having different degrees of cupping, respectively, each with a shim and keeper set to fit its cupping. Of course it will be understood that the bit need not be square but may have any desired number of lateral sides from three upwardly. For example, a tool fabricated in accordance with the teaching of the present invention and having a hexagonal cross-section will provide twelve cutting edges; a tool of octagonal cross-section embodying the present invention will provide sixteen cutting edges.

From the foregoing it will be understood that different degrees of rake clearance may be provided with bits of different degrees of cupping in the same holder.

It should be understood that the present disclosure is for the purpose of illustration only and that this invention includes all modifications and equivalents which fall within the scope of the appended claims.

I claim:
1. A cutting tool comprising a holder having a seat, a shim bearing on the seat, a bit bearing on the shim, a keeper bearing on the bit, and means clamping the parts together on said seat, the lateral sides of the bit meeting at corners to provide cutting edges, the faces of the bit which bear on the shim and keeper respectively being similarly concave in each dimension to provide rake clearance and the faces of the shim and keeper which engage the bit having corresponding convexity so that the bit fits between the shim and keeper with either of its faces bearing on the shim, whereby the bit may be used in any one of a number of positions equal to the number of cutting edges on both of its faces with rake clearance in each position and the bit may be replaced with another bit having different rake clearance merely by substituting a keeper and shim having corresponding convexity.

2. A cutting tool according to claim 1 further characterized in that the faces of the bit are spherical.

References Cited in the file of this patent

UNITED STATES PATENTS

| | | |
|---|---|---|
| 693,974 | Koeller | Feb. 25, 1902 |
| 1,361,851 | Hall | Dec. 14, 1920 |
| 1,397,357 | Bronander | Nov. 15, 1921 |
| 1,449,513 | Jaeger | Mar. 27, 1923 |
| 1,535,028 | Muller | Apr. 21, 1925 |
| 2,370,273 | Ulliman | Feb. 27, 1945 |

FOREIGN PATENTS

| | | |
|---|---|---|
| 2,983 | Great Britain | Feb. 5, 1913 |
| 175,294 | Great Britain | Aug. 17, 1922 |
| 278,611 | Great Britain | Oct. 13, 1927 |
| 351,406 | France | July 17, 1905 |
| 572,063 | Great Britain | Sept. 20, 1945 |